United States Patent [19]
Nordin

[11] 3,879,395
[45] Apr. 22, 1975

[54] 3-(1-PIPERAZINYLALKYLAMINO)-2-CYCLOALKEN-1-ONE COMPOUNDS AND METHODS FOR THEIR PRODUCTION
[75] Inventor: Ivan C. Nordin, Ann Arbor, Mich.
[73] Assignee: Parke, Davis & Company, Detroit, Mich.
[22] Filed: Oct. 23, 1973
[21] Appl. No.: 408,556

[52] U.S. Cl............................ 260/268 PH; 424/250
[51] Int. Cl............................................. C07d 51/70
[58] Field of Search.................. 260/268 PH, 563 R

[56] References Cited
UNITED STATES PATENTS
3,806,510  4/1974  Parcell.......................... 260/268 PH
3,819,630  6/1974  Parcell.......................... 260/268 PH Primary Examiner—Donald G. Daus
Assistant Examiner—Jose Tovar

[57] ABSTRACT

3-[4-[o-(Propylthio)phenyl]-1-piperazinylalkylamino]-2-cycloalken-1-ones, and acid-addition salts, thereof, are pharmacological agents, especially central nervous system depressants of the type known as major tranquilizing agents. They exhibit cerebral depressant activity and suppress conditioned avoidance behavior. Said compounds can be produced by condensation of a 4-[o-(propylthio)phenyl]-1-piperazinylalkylamine with the appropriate 1,3-cycloalkanedione.

7 Claims, No Drawings

3-(1-PIPERAZINYLALKYLAMINO)-2-CYCLOALKEN-1-ONE COMPOUNDS AND METHODS FOR THEIR PRODUCTION

SUMMARY AND DETAILED DESCRIPTION

The present invention relates to new 3-(1-piperazinylalkylamino)-2-cycloalken-1-one compounds. More particularly, the invention relates to new compounds of the formula

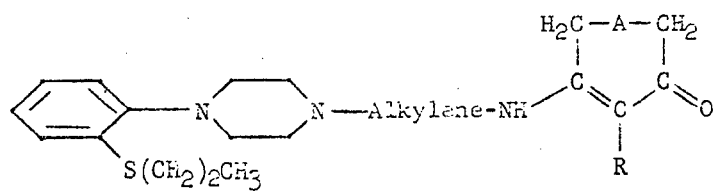

wherein A is a single bond, methylene or isopropylidene; R is hydrogen or methyl and Alkylene is a straight or branched chain alkylene group having from two to six carbon atoms; and acid-addition salts thereof. In addition, this invention relates to methods for the production of the foregoing compounds.

The preferred compounds of this invention are those wherein A is a single bond or isopropylidene; R is hydrogen or methyl and Alkylene is —CH$_2$CH$_2$CH$_2$— or —CH$_2$(CH$_2$)$_2$CH$_2$—.

In accordance with the invention, the foregoing compounds can be produced by reacting a 4-[o-(propylthio)phenyl]-1-piperazinylalkylamine of the formula

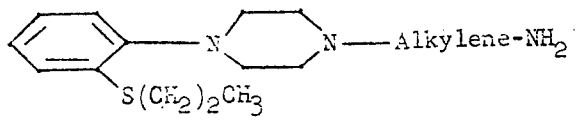

wherein Alkylene is as previously defined with a 1,3-cycloalkanedione of the formula

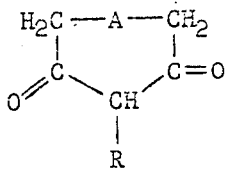

wherein A and R are as previously defined. While this condensation reaction may or may not be carried out in the presence of a solvent, a solvent is preferred. Typical solvents that may be used include hydrocarbons such as benzene, toluene and xylene; chlorinated hydrocarbons such as chloroform, carbon tetrachloride and sym-tetrachlorethane; lower alkanols such as methanol, ethanol and 2-propanol; ethers such as dioxane and tetrahydrofuran; tertiary amides such as N,N-dimethylformamide and N-methyl-2-pyrrolidinone; and mixtures of these. However, it is preferred to use a water immiscible solvent so that the water formed in the reaction can be readily separated. A typical preferred solvent is toluene.

Generally, equimolar quantities of the above reactants are preferred. While an excess of the 1,3-cycloalkyldione is not detrimental, an excess of the 4-[o-(propylthio)phenyl]-1-piperazinylalkylamine should be avoided.

While the temperature that the reaction is conducted at or the time allowed for the reaction to go to completion are not critical, generally, temperatures of from 0°–150° C. are employed for periods of time varying from about one to about 48 hours, with the longer periods of time being used at the lower temperatures. Using a preferred solvent which is water immiscible, such as toluene, the reaction is generally carried out at reflux temperature and the water separated. The reaction is allowed to proceed until the theoretical amount of water is collected.

The products may be isolated and purified in the form of their free bases or converted to an acid addition salt by conventional means. A typical method for preparing an acid-addition salt would be to dissolve the pure or crude free base in a solvent such as an alcohol, for example, isopropanol, an ether, for example, diethyl ether to which a solution of an acid in a solvent such as an alcohol, for example, ethanol, or an ether, for example tetrahydrofuran, is added. The free bases of the invention form acid-addition salts with any of a variety of organic and inorganic acids. Pharmaceutically acceptable acid-addition salts are formed with such acids as hydrochloric, hydrobromic, sulfuric, nitric, phosphoric, acetic, citric, tartaric, succinic, salicylic, maleic, malic, lactic, gluconic, and pamoic acids. The free bases and their salt forms are interconvertible by adjustment of the pH. The free bases are produced by basification and the acidaddition salts are produced by acidification. They differ in solubility properties but, in general, are otherwise equivalent for the purposes of the invention.

Starting materials required for use in the foregoing process can be prepared by any of a number of methods. For example, 1-[o-(propylthio)phenyl]piperazine is reacted with a bromonitrile of the formula Br—Alkylene'—CN wherein Alkylene' represents a straight or branched alkylene group having from one to five carbon atoms, in the presence of potassium carbonate and the product reduced with lithium aluminum hydride followed by hydrolysis to give a 1-(aminoalkyl)-4-[o-(propylthio)phenyl]piperazine compound of the formula

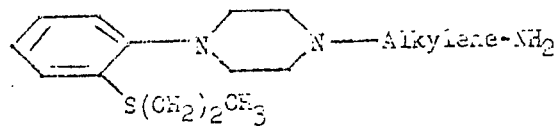

An alternate process for preparing 1-(aminoethyl)-4-[o-(propylthio)phenyl piperazine involves reacting 1-[o-(propylthio)phenyl]piperazine with 2-hydroxyacetonitrile to give a compound of the formula

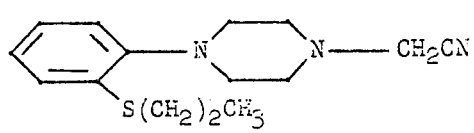

followed by reduction and hydrolysis.

The compounds of the invention can exist in anhydrous form as well as in solvated, including hydrated, forms. In general, the hydrated forms and the solvated forms with pharmaceutically acceptable solvents are equivalent to the anhydrous or unsolvated form for the purposes of the invention.

The compounds of the invention are new chemical compounds of value as pharmacological agents and especially as central nervous system depressants. For example, they are cerebral depressant agents capable of suppressing motor activity. In the applicable test, the motor activity of rats is measured by placing each of a group of rats in a small wire cage suspended from a long, flexible, spiral spring in such a manner that it moves up and down in response to each movement or change in balance of the animal. The motion of each rat is cumulatively recorded. Treatment of a rat with desoxyephedrine alone causes an increase in motor activity and a resulting increase in the movement of the cage. In carrying out the procedure, a test compound is given by the subcutaneous or oral route and 15 minutes later a standard dose of desoxyephedrine, 2.4 mg./kg., is given subcutaneously. The rats are immediately placed in the cages and left for 2 hours. The effectiveness of a test compound as a cerebral depressant is rated according to the following scale in which percentages are percent suppression of desoxyephedrine-induced activity: 1+ = up to 25%; 2+ = 26–50%; 3+ = 51–75%; 4+ = 76–100%. Some results obtained for representative preferred compounds of the invention are as follows: 5,5-Dimethyl-3-[[2-[4-[o-(propylthio)phenyl]-1-piperazinyl]ethyl]amino]-2-cyclohexen-1-one, monohydrochloride; 4+ at 3 to 50 mg./kg. subcutaneous administration, 4+ at 12.5–50 mg./kg. oral administration; 5,5-dimethyl-3-[[4-[o-(propylthio)phenyl]-1-piperazinyl]propyl]amino]-2-cyclohexen1-one; 4+ at 3–50 mg./kg, subcutaneous administration, 4+ at 6–50 mg./kg. oral administration; 5,5-dimethyl-3-[[4-[4-[o-(propylthio)phenyl]-1-piperazinyl]butyl]amino]-2-cyclohexen1-one, dihydrochloride; 4+ at 12.5–50 mg./kg. subcutaneous administration, 4+ at 6–50 mg./kg. oral administration; 2-methyl-3-[[4-[4-[o-(Propylthio)phenyl]-1-piperazinyl]butyl]amino]-2-cyclohexen-1-one; 4+ at 3–50 mg./kg. subcutaneous administration, 4+ at 12.5–50 mg./kg. oral administration; 2-methyl-3-[[4-[4-[o-(propylthio)phenyl]1-piperazinyl butyl]amino]-2-cyclopenten-1-one; 4+ at 3–50 mg./kg. subcutaneous administration, 4+ at 6–50 mg./kg. oral administration.

Another way in which the central nervous system depressant activity of the compounds of the invention can be demonstrated is by measuring their ability to suppress an avoidance behavior to which test animals have been conditioned. Activity in this type of test correlates with so-called major tranquilizer or anti-psychotic activity. Rats are trained to leave a test chamber in order to avoid an electrical shock delivered to the floor of the chamber. A compound is considered to be active in this test if it suppresses the conditioned behavior of the trained rats to leave the chamber before the electrical shock is delivered. In general, the most active compounds of the invention exhibit a high degree of activity (median effective dose) in this test at dosages of 3–6 mg./kg., intraperitoneal route, a dosage range in which the known agent, chlorpromazine, exhibits a similar level of activity, which others require doses of up to about 15 mg./kg.

The invention is illustrated by the following example.

EXAMPLE

A solution of 14.0 g. of 1-(2-aminoethyl)-4-[o-(propylthio)phenyl]piperazine and 7.0 g. of 5,5-dimethyl 1,3-cyclohexanedione in 80 ml. of toluene is heated at reflux under a water separator for 3 hours or until one equivalent of water is separated. The solution is evaporated at reduced pressure to give 5,5-dimethyl-3-[[2-[4-[o-(propylthio)phenyl]-1-piperazinyl]ethyl]amino]-2-cyclohexene-1-one as a syrupy residue. This free base is dissolved in 2-propanol and the solution treated with an excess of hydrogen chloride dissolved in 2-propanol. The resulting precipitate crude 5,5-dimethyl-3-[[2-[4-[o-(propylthio)phenyl]-1-piperazinyl]ethyl]amino]-2-cyclohexen-1-one dihydrochloride, is removed by filtration, washed with ether and dried; m.p. 232°–247° C. The 5,5-dimethyl-3-[[2-[4-[o-(propylthio)phenyl]-1-piperazinyl] ethyl]amino]-2-cyclohexen-1-one dihydrochloride salt is dissolved in methanol and excess ethylene oxide is added to the solution, which is allowed to stand at room temperature for 2 hours, then evaporated at reduced pressure to give 5,5-dimethyl-3-[[2-[4-[o-(propylthio)phenyl]-1-piperzinyl]ethyl]amino]-2-cyclohexen-1-one monohydrochloride (obtained as a one-fourth hydrate); m.p. 204°–206° C. after crystallization from 2-propanol-ether.

The following additional products are prepared similarly.

From 8.8 g. of 1-(3-aminopropyl)-4-[o-(propylthio)phenyl]piperazine, prepared by the procedure described in U.S. Pat. No. 2,836,595, and 4.2 g. of 5,5-dimethyl-1,3-cyclohexanedione, there is obtained 5,5-dimethyl-3-[[3-[4-[o-(propylthio)phenyl]-1-piperazinyl]propyl]amino]-2-cyclohexen-1-one; m.p. 106.5°–108.5° C. after two crystallizations from ethyl acetate-pentane, one from ethyl acetate and one from acetonitrile.

From 6.0 g. of 1-(4-aminobutyl)-4-[o-(propylthio)phenyl]piperazine and 2.73 g. of 5,5-dimethyl-1,3-cyclohexanedione, there is obtained 5,5-dimethyl-3-[[4-[4-[o-(propylthio)phenyl]-1-piperazinyl]butyl]amino]-2-cyclohexen-1-one which is converted to 5,5-dimethyl-3-[[4-[4-[o-(propylthio)phenyl]-1-piperazinyl]butyl]amino]-2-cyclohexen-1-one, dihydrochloride; m.p. 207°–212° C. after crystallization from acetonitrile-ethanol-water.

From 9.65 g. of 1-(5-aminopentyl)-4-[o-(propylthio)phenyl]piperazine, prepared by the procedure described in U.S. Pat. No. 2,836,595, and 4.2 g. of 5,5-dimethyl-1,3-cyclohexanedione, there is obtained 5,5-dimethyl-3-[[5-[4-[o-(propylthio)phenyl]-1-piperazinyl]pentyl]amino]-2-cyclohexen-1-one; m.p. 84°–85.5° C. after two crystallizations from ethyl acetate-pentane.

From 10.9 g. of 1-(3-aminopropyl)-4-[o-(propylthio)phenyl]piperazine, prepared by the procedure described in U.S. Pat. No. 2,836,595, and 5.7 g. of 2,5,5-trimethyl-1,3-cyclohexanedione, there is obtained 2,5,5-trimethyl-3-[[3-[4-[o-(propylthio)phenyl]-1-piperazinyl]propyl]amino]-2-cyclohexen-1-one. This crude free base is dissolved in toluene and the solution is chromatographed on a column of neutral alumina. The column is washed thoroughly with toluene and the washings discarded. The column is then eluted with acetonitrile. The eluate is collected and evaporated at reduced pressure to give the purified free base as a viscous oil. As described above, the free base is converted to the 2,5,5-trimethyl-3-[[3-[4-[o-(propylthio)phenyl]-1-piperazinyl]propyl]amino]-2-cyclohexen-1-one dihydrochloride and then to the 2,5,5-trimethyl-3-[[3-[4-[o-(propylthio)phenyl]-1-piperazinyl]propyl]amino]-2-cyclohexen-1-one monohydrochloride salt; m.p. 162°–164° C. after crystallization from 2-propanol-ether.

From 14.7 g. of 1-(3-aminopropyl)-4-[o-(propylthio)phenyl]piperazine, prepared by the procedure described in U.S. Pat. No. 2,836,595, and 6.3 g. of 2-methyl-1,3-cyclohexanedione, there is obtained 2-methyl-3-[[3-[4-[o-(propylthio)phenyl]-1-piperazinyl]propyl]amino]-2-cyclohexen-1-one. This crude free base is dissolved in toluene and the solution is chromatographed on a column of neutral alumina. The column is washed thoroughly with toluene and the washings discarded. The column is then eluted with acetonitrile. The eluate is collected and evaporated at reduced pressure (150°/0.1 mm) to give the purified free base as a viscous oil.

From 9.2 g. of 1-(4-aminobutyl)-4-[o-(propylthio)phenyl]piperazine and 3.8 g. of 2-methyl-1,3-cyclohexanedione, there is obtained a 2-methyl-3-[[4-[4-[o-(propylthio)phenyl]-1-piperazinyl]butyl]amino]-2-cyclohexen-1-one. This crude free base is dissolved in toluene and the solution is chromatographed on a column of neutral alumina. The column is washed thoroughly with toluene and the washings discarded. The column is then eluted with acetonitrile. The eluate is collected and evaporated at reduced pressure (150°/0.1 mm) to give the purified free base as a viscous oil.

From 14.7 g. of 1-(3-aminopropyl)-4-[o-(propylthio)phenyl]piperazine, prepared by the procedure described in U.S. Pat. No. 2,836,595, and 5.6 g. of 2-methyl-1,3-cyclopentanedione, there is obtained 2-methyl-3-[[3-[4-[o-(propylthio)phenyl]-1-piperazinyl]propyl]amino]-2-cyclopenten-1-one. This crude free base is dissolved in toluene and the solution is chromatographed on a column of neutral alumina. The column is washed thoroughly with toluene and the washings discarded. The column is then eluted with acetonitrile. The eluate is collected and evaporated at reduced pressure (150°/0.1 mm) to give the purified free base as a viscous oil.

From 9.2 g. of 1-(4-aminobutyl)-4-[o-(propylthio)phenyl]piperazine and 3.36 g. of 2-methyl-1,3-cyclopentanedione, there is obtained 2-methyl-3-[[4-[4-[o-(propylthio)phenyl]-1-piperazinyl]butyl]amino]-2-cyclopenten-1-one. This crude free base is dissolved in toluene and the solution is chromatographed on a column of neutral alumina. The column is washed thoroughly with toluene and the washings discarded. The column is then eluted with acetonitrile. The eluate is collected and evaporated at reduced pressure to give the purified free base as a viscous oil which is further purified by distillation; b.p. 265°–270°/0.1 mm. On standing, the distillate solidifies; m.p. 73°–76° C. after three crystallizations from ethyl acetate-pentane.

From 14.7 g. of 1-(3-aminopropyl)-4-[o-(propylthio)phenyl]piperazine, prepared by the procedure described in U.S. Pat. No. 2,836,595, and 5.6 g. of 1,3-cyclohexanedione, there is obtained 3-[[3-[4-[o-(propylthio)phenyl]-1-piperazinyl]propyl]amino]-2-cyclohexen-1-one.

From 9.2 g. of 1-(4-aminobutyl)-4-[o-(propylthio)phenyl]piperazine and 2.94 g. of 1,3-cyclopentanedione, there is obtained 3-[[4-[4-[o-(propylthio)phenyl]-1-piperazinyl]butyl]amino]-2-cyclopenten-1-one.

STARTING MATERIALS

A mixture of 236 g. of 1-(o-propylthiophenyl)piperazine, 155 g. of 4-bromobutyronitrile, 200 g. of anhydrous potassium carbonate, and 800 ml. of 2-butanone is stirred and heated at reflux for 16 hours, then cooled and filtered. The filtrate is evaporated under reduced pressure and the residue is dissolved in one liter of ether. The ether solution, containing 4-(o-propylthiophenyl)-1-piperazinebutyronitrile, is washed with water, dried thoroughly, and added slowly to a stirred slurry of 42 g. of lithium aluminum hydride in 2 liters of ether. The resulting mixture is stirred and heated at reflux for 4 hours, then cooled, and treated successively with 44 ml. of water, 33 ml. of 20% aqueous sodium hydroxide, and 157 ml. of water. The mixture is filtered and the filtrate evaporated to give a residue of 1-(4-aminobutyl)-4-(o-propylthiophenyl)piperazine as an oil which is purified by distillation under reduced pressure; b.p. 158°–163° C. at 0.08 mm.

Glycolonitrile, 34.1 g., is added portionwise to 59.1 g. of 1-[o-(propylthio)phenyl]piperazine with stirring at room temperature. The mixture is allowed to stand at room temperature for 16 hours and the resulting crystalline product, 4-[o-(propylthio)phenyl]-1-piperazineacetonitrile, is recrystallized twice from aqueous ethanol; m.p. 93°–96° C.

A solution of 53.0 g. of 4-[o-(propylthio)phenyl]-1-piperazineacetonitrile in 250 ml. of tetrahydrofuran is added dropwise to a stirred suspension of 14.4 g. of lithium aluminum hydride in 500 ml. of ether. The resulting mixture is stirred at room temperature for 16 hours, then treated in turn with 15 ml. of water, 11 ml. of 20% aqueous sodium hydroxide and 53 ml. of water. The mixture is filtered and the filtrate evaporated to give 1-(2-aminoethyl)-4-[o-(propylthio)phenyl]piperazine as an oil which is purified by distillation at reduced pressure; b.p. 143°–146°/0.1 mm.

I claim:
1. A compound of the formula

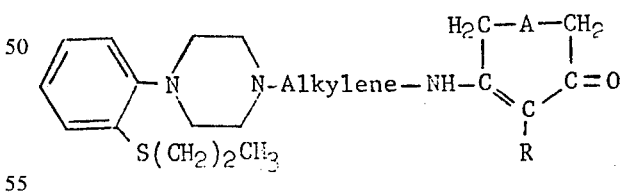

wherein A is a single bond, methylene or isopropylidene, R is hydrogen or methyl and Alkylene is —CH$_2$CH$_2$CH$_2$— or —CH$_2$(CH$_2$)$_2$CH$_2$— or pharmaceutically acceptable acid addition salts thereof.

2. The compound according to claim 1 which is 5,5-dimethyl-3-[[3-[4-[o-(propylthio)phenyl]-1-piperazinyl]propyl]amino]-2-cyclohexen-1-one or pharmaceutically acceptable acid addition salts thereof.

3. The compound according to claim 1 which is 2-methyl-3-[[4-[o-(propylthio)phenyl]-1-piperazinyl]butyl]amino]-2-cyclopenten-1-one or pharmaceutically acceptable acid addition salts thereof.

4. A process for the production of a compound as defined in claim 1, which comprises the step of reacting a compound of the formula

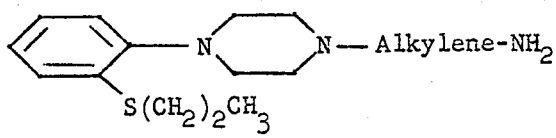

wherein Alkylene is as defined in claim 1, with a compound of the formula

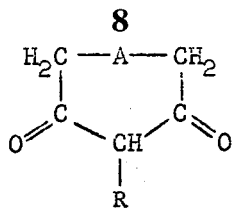

wherein A and R are as defined in claim 1 and isolating the product as the free base or as a salt.

5. The process of claim 4 wherein said process is carried out in a water immiscible solvent.

6. The process of claim 4 wherein Alkylene is —CH$_2$CH$_2$CH$_2$—, A is isopropylidene and R is hydrogen.

7. The process of claim 4 wherein Alkylene is —CH$_2$(CH$_2$)$_2$CH$_2$—, A is a single bond and R is methyl.

* * * * *